US009305019B2

(12) United States Patent
Enga

(10) Patent No.: US 9,305,019 B2
(45) Date of Patent: Apr. 5, 2016

(54) METHOD OF ASSOCIATING USER RELATED DATA WITH SPATIAL HIERARCHY IDENTIFIERS FOR EFFICIENT LOCATION-BASED PROCESSING

(75) Inventor: David Enga, Chantilly, VA (US)

(73) Assignee: Craxel, Inc., Chantilly, VA (US)

( * ) Notice: Subject to any disclaimer, the term of this patent is extended or adjusted under 35 U.S.C. 154(b) by 1454 days.

(21) Appl. No.: 12/010,798

(22) Filed: Jan. 30, 2008

(65) Prior Publication Data

US 2008/0183730 A1 Jul. 31, 2008

Related U.S. Application Data

(60) Provisional application No. 60/898,018, filed on Jan. 30, 2007.

(51) Int. Cl.
*G06F 17/30* (2006.01)
(52) U.S. Cl.
CPC ...... *G06F 17/30241* (2013.01); *G06F 17/3087* (2013.01); *G06F 17/30876* (2013.01)
(58) Field of Classification Search
CPC .......... G06F 17/3087; G06F 17/30241; G06F 17/30876
USPC .......................................... 707/101, 100, 724
See application file for complete search history.

(56) References Cited

U.S. PATENT DOCUMENTS

| 6,252,547 | B1 * | 6/2001 | Perry et al. ..................... 342/367 |
| 6,401,029 | B1 * | 6/2002 | Kubota et al. ................. 701/201 |
| 6,954,697 | B1 * | 10/2005 | Smith ........................... 701/209 |
| 2003/0036848 | A1 * | 2/2003 | Sheha et al. .................. 701/209 |
| 2005/0204014 | A1 * | 9/2005 | Yao et al. ...................... 709/217 |
| 2006/0188327 | A1 * | 8/2006 | Moon ........................... 403/325 |
| 2007/0016565 | A1 * | 1/2007 | Evans et al. ...................... 707/3 |
| 2007/0041336 | A1 * | 2/2007 | Wan et al. ..................... 370/256 |
| 2007/0258623 | A1 * | 11/2007 | McGrath et al. .............. 382/104 |

* cited by examiner

*Primary Examiner* — Rehana Perveen
*Assistant Examiner* — Tiffany Thuy Bui
(74) *Attorney, Agent, or Firm* — Akerman LLP; Michael K. Dixon

(57) ABSTRACT

A program storing computer-readable instructions therein for instructing a computer to perform analytical steps for associating user related data with a spatial hierarchy identifier, the program comprising a recording medium readable by the computer and the computer instructions stored on said recording medium instructing the computer to perform the processes including receiving user related data, determining the user that is associated with the user related data, determining the at least one location associated with the user, associating the at least one location with at least one first spatial hierarchy identifier, and associating the user related data with the at least one first spatial hierarchy identifier.

13 Claims, 7 Drawing Sheets

METHOD OF ASSOCIATING USER RELATED DATA WITH SPATIAL HIERARCHY IDENTIFIERS FOR EFFICIENT LOCATION-BASED PROCESSING

This invention claims the benefit of U.S. Provisional Application No. 60/898,018 filed on Jan. 30, 2007, which is hereby incorporated by reference in its entirety.

BACKGROUND OF THE INVENTION

1. Field of the Invention

The embodiments of the invention relate to location-based applications, and more particularly to a method for associating user related data with spatial hierarchy identifiers for efficient location-based processing. Although embodiments of the invention are suitable for a wide scope of applications, it is particularly suitable for improving the performance and scalability of location-based search and location-based analytical processing.

2. Discussion of the Related Art

In general, existing location-based applications require too much processing because of the calculations required by the geospatial indexes typically used by location-based applications.

A location can be represented by a street address. Before a location-based search can be performed, the street address must be converted into a form than can be used by the search. Typically, a location-based search algorithm would expect to receive a latitude/longitude or possibly a set of latitude/longitude points that make up some shape. Converting a street address into a multi-dimensional coordinate system such as latitude/longitude is inefficient because of the slow geo-coding process required to convert the address. The geo-coding process requires searching through a very large data set of address range information indexed by street name, city, state and/or zip code. Once a matching street segment and address range is found, the multi-dimensional position is interpolated from the start and end coordinates stored with the street segment. Performance of online and mobile applications would not be acceptable to users if this geo-coding process were required for every location-based operation. Typically, the geo-coding process is performed once and the resulting multi-coordinate system representation used for any subsequent location-based operations.

Locations can also be represented in several multi-dimensional coordinate systems, the most prominent example being a geographic coordinate systems represented by latitude and longitude. The common approach in the art is to represent all data and input parameters using a multi-dimensional coordinate system. This includes location-based data such a business locations, user locations, results presented to a user and associated with a location, and actions taken by users at a location. A geospatial index such as an Rtree or QuadTree is typically used to perform operations such as location-based search on geospatial data sets. Searches of the tree indexes associated with Rtree and QuadTree begin at the root node of the associated tree data structure. The boundaries of each child node are compared with the incoming point or shape to determine which child nodes must be searched to find all the possible matches. Each child node that matches the incoming point or shape is searched recursively. The calculations to determine whether a child node matches an input point or shape are computationally expensive. While the index provides the primary filtering, the secondary filtering required to check each data item held in the matching child nodes against the input point or shape is also very computationally expensive. In order to gain some amount of scalability, geospatial indexes can simply be replicated across multiple computers. However, replication is not an effective method of scaling because as the data sets get large, the performance of the index deteriorates. Each replicated index has the same poor performance. Existing indexes typically use disk to store the data, which can be a thousand times or more slower than memory access. Unfortunately, existing indexes do not support efficient distribution, partitioning and load-balancing across multiple computers and therefore must use disk storage to handle a large amount of data. To handle a large number of users, the only existing solution is to replicate the entire index and all of its data held in disk storage across multiple computers. Even if the indexes could be efficiently distributed, partitioned, and load-balanced across multiple computers, the input point or shape would have to be initially processed to determine which child nodes in the index contained candidates. If the input point or shape was represented using multi-dimensional coordinates, the initial request processor would have to have a copy of the index so that it could calculate which child nodes contained candidates. The initial request processor's copy of the index would not have to hold the actual data, but the initial request processor would have to know the boundaries of each child node. Given the difficulties described, existing indexing methods can not be efficiently distributed, partitioned, and load-balanced across multiple computers and therefore can not efficiently scale to large data sets and a large number of users.

After a location-based search has taken place and a user has received the results, the user may perform some action upon one or more of the results. Capturing the results and the actions associated with the location(s) initially provided to the search is desirable for analysis as to the relevance of a result at a specific location. However, capturing the location associated with the results and subsequent actions using only multi-dimensional coordinates is not desirable because of the inefficient indexing already described. Capturing all of the results and actions taken by users over time will generate very large data sets and require more efficient processing than can be provided by existing geospatial indexing methods. Multi-coordinate system representations of location are not sufficient for efficient processing because of the limitations of the existing indexing methods, including the inability to distribute, partition or load-balance the indexes across multiple computers. The association of a user locations and actions taken by a user at those locations must be sufficient to allow for efficient processing of location-based operations as well as for timely analytical processing of a very large number of collected user actions.

SUMMARY OF THE INVENTION

Accordingly, embodiments of the invention are directed to a method of associating user related data with spatial hierarchy identifiers for efficient location-based processing that substantially obviates one or more of the problems due to limitations and disadvantages of the related art.

An object of embodiments of the invention is to provide an improved way to associate user related data such as user identifiers, results generated by a user request, user related data pushed unrequested to a user, and user actions with spatial hierarchy identifiers that can be used for efficient, distributed, partitioned, load-balanced location-based processing.

Another object of embodiments of the invention is to provide an improved way to preprocess a data set for efficient, distributed, location-based processing.

Another object of embodiments of the invention is to provide an improved way to securely represent a spatial hierarchy identifier that can be used for efficient, distributed, partitioned, and load-balanced location-based processing.

Another object of embodiments of the invention is to provide an improved way to authenticate a spatial hierarchy identifier.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, method of associating user related data with spatial hierarchy identifiers for efficient location-based processing includes a program storing computer-readable instructions therein for instructing a computer to perform analytical steps for associating user related data with a spatial hierarchy identifier, the program comprising a recording medium readable by the computer and the computer instructions stored on said recording medium instructing the computer to perform the processes including receiving user related data, determining the user that is associated with the user related data, determining the at least one location associated with the user, associating the at least one location with at least one first spatial hierarchy identifier, and associating the user related data with the at least one first spatial hierarchy identifier.

In yet another aspect, a program storing computer-readable instructions therein for instructing a computer to perform analytical steps for preprocessing data for efficient location-based indexing, the program comprising a recording medium readable by the computer, and the computer instructions stored on said recording medium instructing the computer to perform the processes including loading data associated with at least one location, generating at least one first spatial hierarchy identifier for identifying first regions within a first spatial hierarchy associated with the at least one location, and storing the data with the at least one first spatial hierarchy identifier.

In yet another aspect, a program storing computer-readable instructions therein for instructing a computer to perform analytical steps for securing a spatial hierarchy identifier, the program comprising a recording medium readable by the computer, and the computer instructions stored on said recording medium instructing the computer to perform the processes including receiving at least one spatial hierarchy identifier, and encrypting the at least one spatial hierarchy identifier.

In yet another aspect, a program storing computer-readable instructions therein for instructing a computer to perform analytical steps for authenticating a spatial hierarchy identifier, the program comprising a recording medium readable by the computer, and the computer instructions stored on said recording medium instructing the computer to perform the processes including receiving at least one spatial hierarchy identifier and a digital signature, and verifying the digital signature for the at least one spatial hierarchy identifier.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
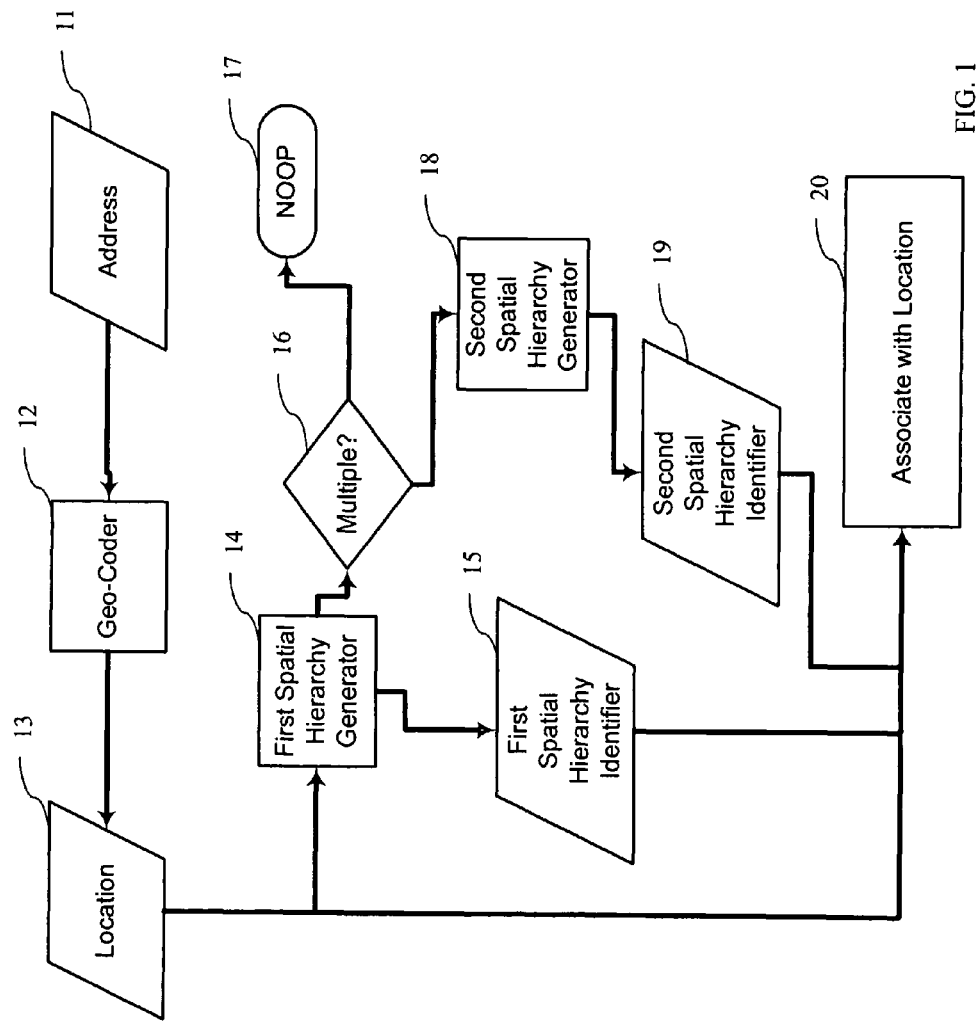
FIG. 1 shows associating a location with a spatial hierarchy.

FIG. 1 shows associating a location with a spatial hierarchy. In this example, an address 11 is geo-coded into a location 13 represented with multi-dimensional coordinates such as latitude and longitude. Geo-Coder 12 queries a database that contains street names, street prefixes and suffixes, states, zip codes, and optionally place names. The geo-coder 12 normalizes the address 11 submitted by the user, if possible, otherwise it returns an error. The components of the normalized street address are used to query the street address database. These components can include zip code, city, state, street name, street number, or other commonly used components of an address. The geo-coding database contains street segments indexed by street name, address range, zip code, state, and optionally city or place designator. Each street segment contains a start point and an end point. Intermediate points may also be included. The query of the street address database finds the street segment that includes address 11 in the street segments address range. The geo-coder 12 interpolates the location for the submitted address 11 using a simple linear interpolation process that assumes each address in the street segment address range has the same length. Typically, the addresses are not the same length and so the linear interpolation is subject to some error. After the geo-coder 12 is complete, the location 13 can be sent to a first spatial hierarchy generator 14. The first spatial hierarchy generator creates the first spatial hierarchy identifier 15 using the spatial hierarchy that will be used for first spatial hierarchies. Decision block 16 will determine if a second spatial hierarchy should be generated. If the process is configured or directed to create a second spatial hierarchy identifier, then second spatial hierarchy generator 18 will generate a second spatial hierarchy identifier 19 using a spatial hierarchy that is different than the spatial hierarchy used by the first spatial hierarchy generator 14. If a second spatial hierarchy is not going to be generated, then the decision block terminates with a NOOP 17. The first spatial hierarchy identifier 15 and the optional second spatial hierarchy identifier 19 can be associated with location 13 through the associate with location 20 process. The associate with location 20 process can store the association between location and spatial hierarchy identifiers in a variety of ways. FIG. 2-FIG. 5 describes one way to generate a spatial hierarchy identifier.

The use of spatial hierarchy identifiers will improve the performance of location-based processing because the identifiers include the path through a spatial hierarchy for the location or area represented by the identifier. The specification that a spatial hierarchy identifier must include the path through a spatial hierarchy is important so that the computers assigned to different parts of the index can be determined efficiently. A map is created that indicates which parts of the spatial hierarchy are managed by which computers. The path indicated by the spatial hierarchy identifier is used to look up all of those computers in the map of the spatial hierarchy. In the implementation of the map, the address of the computers themselves may be used or a computer identifier of any sort, or a messaging address, queue, or topic. There are no constraints on how the computers are identified or the transport required. The path specified in the spatial hierarchy identifier is essential for the distribution, partitioning, and load-balancing of the location-based indexing solution. Therefore, associating spatial hierarchy identifiers with users, locations, and results associated with a location, and actions associated with a location allow for efficient location-based processing.

Figure 2:
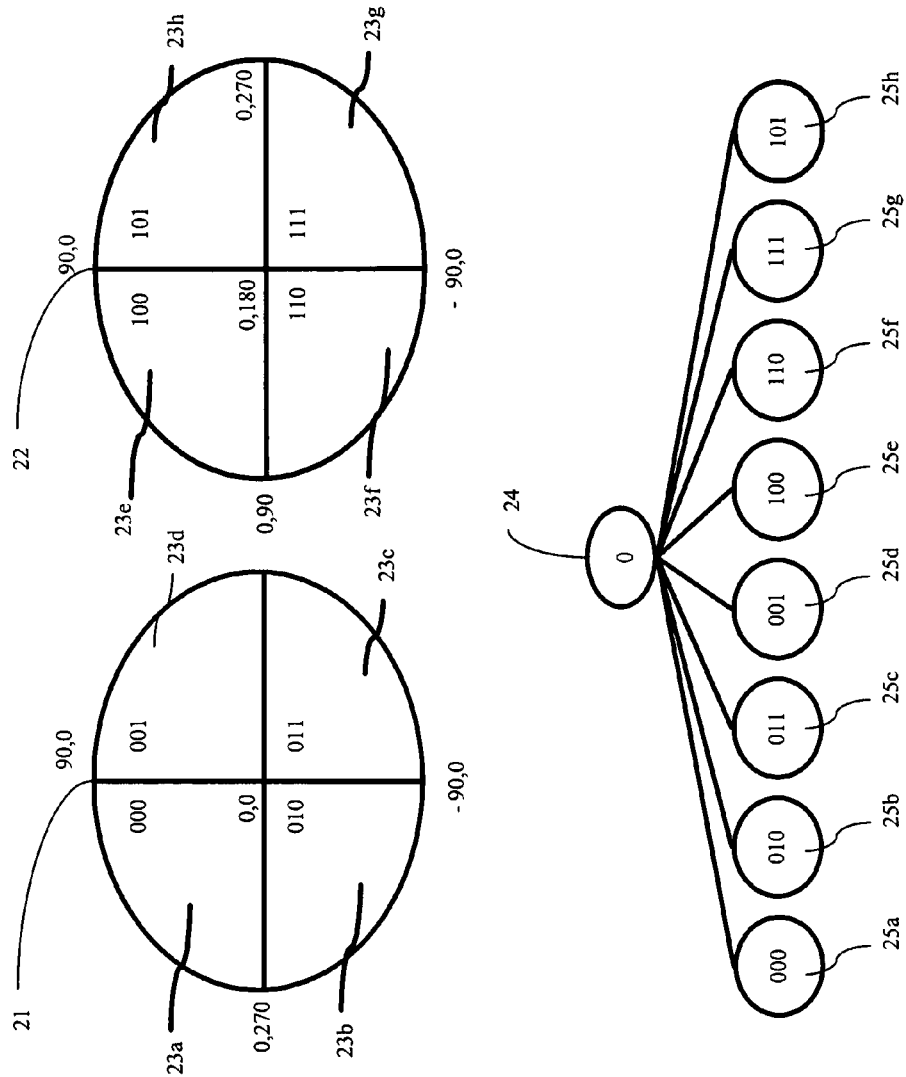
FIG. 2 shows the initial subdivision of a sphere within a universal spatial hierarchy.

FIG. 2 shows the initial subdivision of a sphere within a spatial hierarchy. Subdivision is the first step in generating a spatial hierarchy identifier. For simplicity, the sphere is shown in two halves, 21 and 22. The sphere is divided into eight spherical triangles 23. Each subdivision is assigned a bit identifier from 0-7, although a string identifier can be used as well. The depth of the initial subdivision is 0. Depth specifies the level of recursive subdivision.

The specific recursive subdivision of a sphere shown in FIG. 2 is known as hierarchical triangular mesh. However, any regular decomposition of space can be used. The corresponding data structure 24 contains a root node and eight child nodes 25, each associated with a spherical triangle of the initial subdivision. For instance, one of the spherical triangles 23 has an identifier of {000} that corresponds to the child node 25 with an identifier of {000}. Each child node is therefore associated with the entire region of its corresponding spherical triangle. There is no overlap between nodes at the same depth. All space is allocated.

Figure 3:
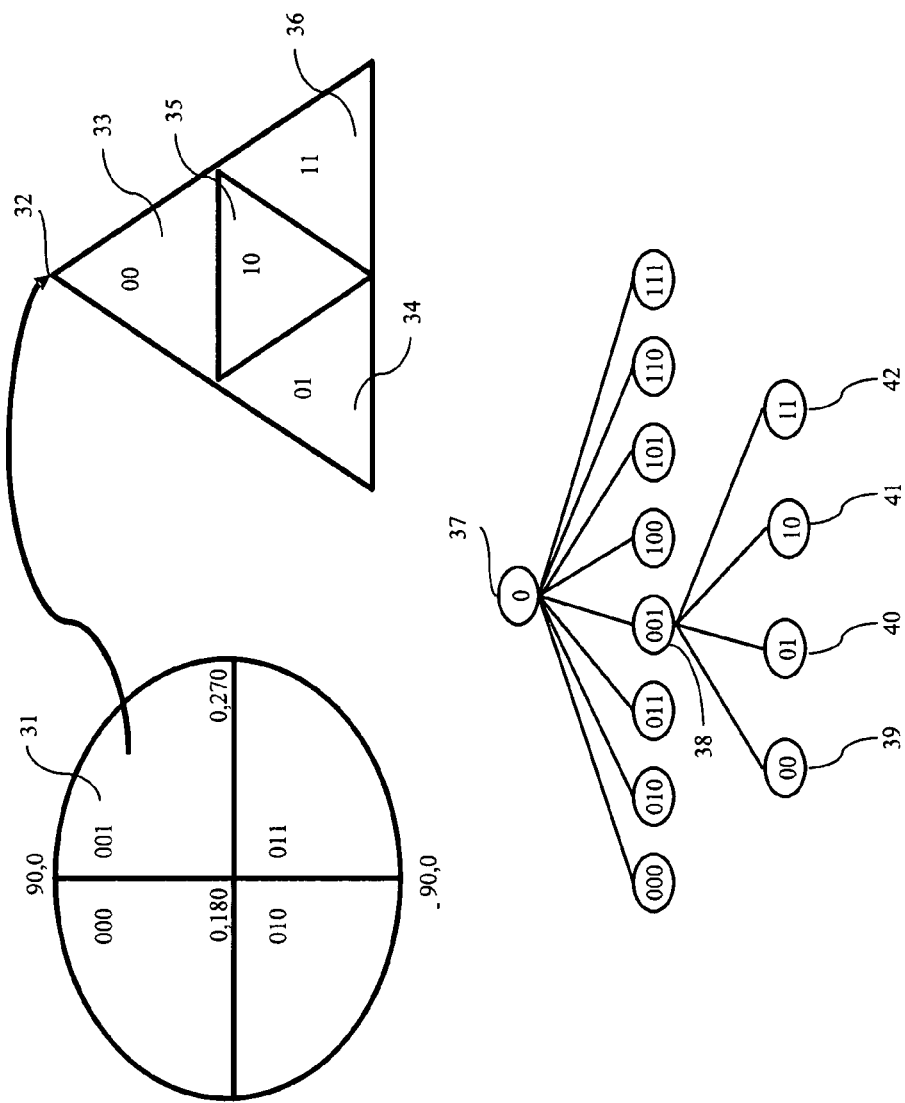
FIG. 3 shows the subdivision of a spherical triangle and resulting spatial hierarchy.

FIG. 3 shows how a spherical triangle can be further recursed into four sub-triangles and the corresponding data structure 37. Spherical triangle 31 is subdivided into four sub-triangles, 33, 34, 35 and 36. Spherical triangle 31 is associated with node 38 in the data structure. This node has four children, 39-42. These children correspond to the sub-triangles, 33-36. The recursive subdivision can continue until level or depth 26, when the computer representation of numbers, double precision, no longer supports the continued subdivision of space.

Figure 4:
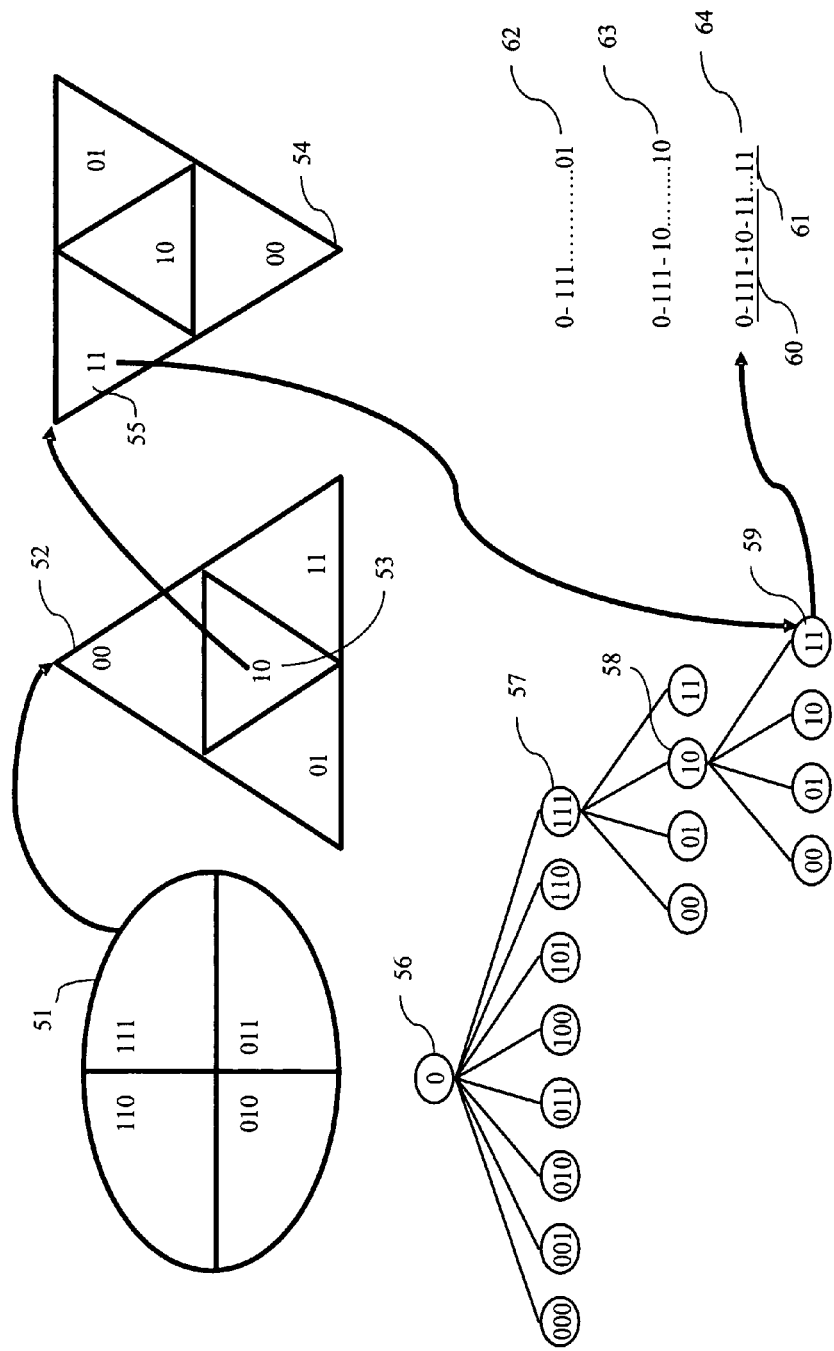
FIG. 4 shows the further recursive decomposition of successive triangles and resulting data structure.

FIG. 4 shows several levels of subdivision, the associated data structure 56, and the resulting spatial hierarchy identifiers 62, 63, and 64 at several levels. Although the associated data structure is shown, the data structure is not used in the generation of the identifiers. The spatial hierarchy identifiers, which include a sequence of node identifiers and a depth, specify the path to a given node in the spatial hierarchy. A spherical triangle 51 is subdivided into four sub-triangles 52. A spherical triangle 51 has an assigned individual identifier {111}. The depth of spherical triangle 51 is one. Only the initial node {0} is in the path. Therefore, the generated spatial identifier for spherical triangle 51 is {0111 . . . 01}, which corresponds to node 57 in the data structure 56. The identifiers are typically held as 64-bit values, but for simplicity, only the bits significant for the associated depth are shown in FIG. 4.

Subdividing sub-triangle 53 of the four sub-triangles 52, gives four more second sub-level triangles 54. Sub-triangle 53 has an individual identifier of {10} and is at a second level depth indicated by {10}. Combining the individual identifier of the spherical parent triangle {111} for sub-triangle 53, the individual identifier {10} for sub-triangle 53, and the second level depth {10}, generates the full identifier 63 for the sub-triangle 53 as {011110 . . . 10}. Sub-triangle 53 corresponds to a node 58 in the data structure 56. The parent of sub-triangle 53 is the corresponding node 57 of the spherical parent triangle 51. Sub-triangle 53 is then subdivided into four second sub-level triangles 54. Second sub-level triangle 55 is shown is node 59 identified by the full identifier 64 of {01111011 . . . 11}. The full identifier of the second sub-level triangle 55 has three parts, the path {0-111-10} through other nodes, the individual identifier {11} of the second sub-level triangle 55 and the third level depth {11}. Along with a map of computers associated with a spatial hierarchy, this full identifier can be used to determine which computers containing a distributed index must be visited to execute a complete location-based operation. A complete location-based operation must visit node {0}, node {0-111}, node {0-111-10}, and node {0-111-10-11}. An example map could show that node {0} is contained in computer A, and node {0-111} and all children are contained in computer B. To conduct a full location-based operation on {01111011 . . . 11} would require visits to computer A and computer B. Those visits would typically be conducted in parallel. The map could also indicate that computer A and computer C both were assigned to node {0} and the location-based operation could be performed by visiting either computer A or computer C along with computer B. This allows for load-balancing. Therefore, it is essential that users and related data be associated with spatial hierarchy identifiers so that location-based processing can be performed using a distributed, parallel architecture.

Figure 5:
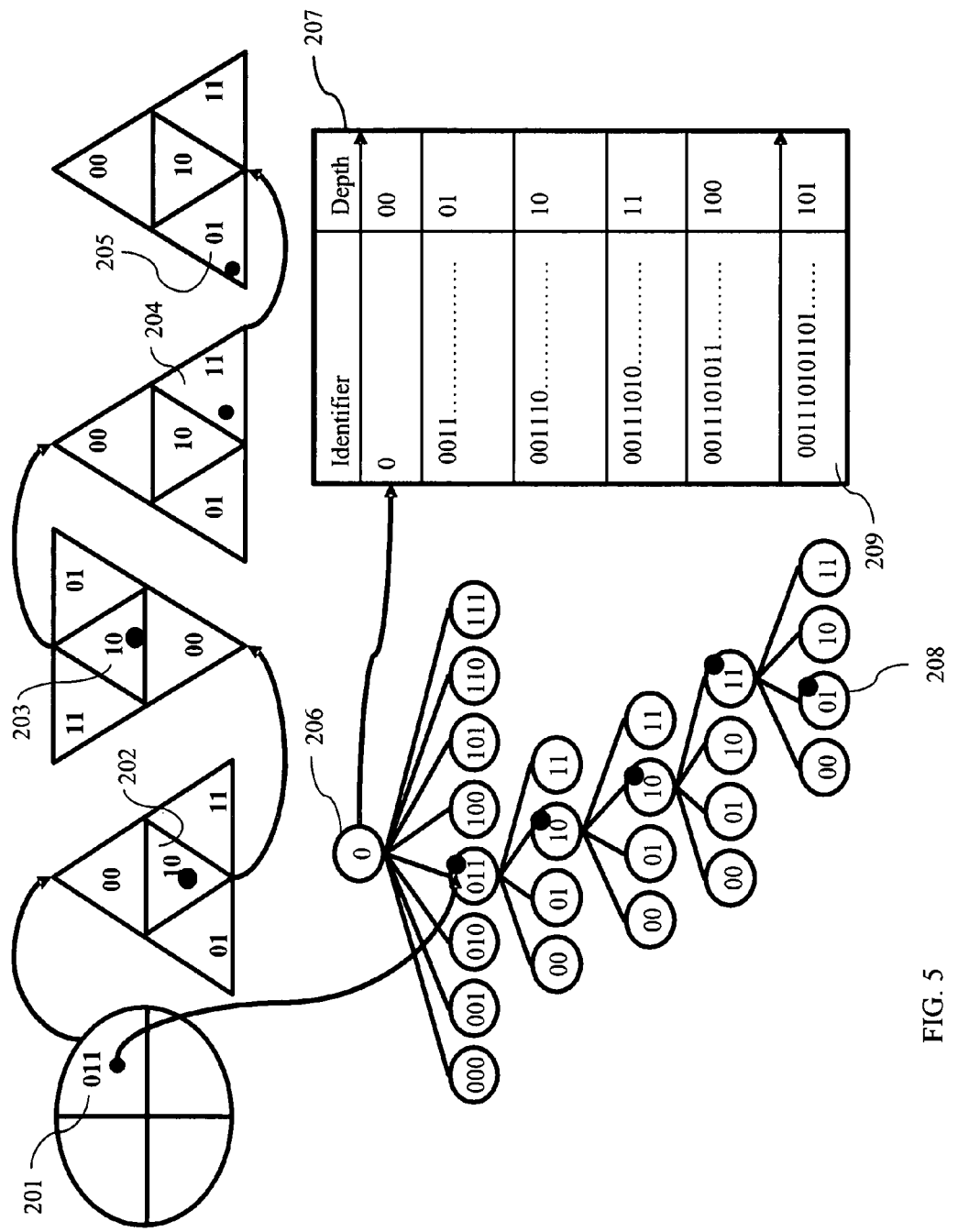
FIG. 5 shows the generation of a spatial hierarchy identifier for a location.

FIG. 5 shows the generation of a spatial hierarchy identifier for a location. The point is located in spherical triangle 201 with an individual identifier of {011}. Spherical triangle 201 is subdivided into four sub-triangles. In the next level, the point is in sub-triangle 202 with an individual identifier of {10}. Sub-triangle 202 is subdivided into four second sub-level triangles. In the next level, the point is second sub-level triangle 203 with an individual identifier of {10}. Since this recursive subdivision is generating an identifier for a point location, the recursive subdivision continues until the maximum depth specified for the spatial hierarchy is reached. The maximum depth specified for the spatial hierarchy shown is set to five.

During the recursive process, the path that the process follows down the tree is being stored, and each node identifier is appended to the path. Table 207 shows the identifiers at each level. The recursive subdivision is terminated at level five and the identifier 209 for the point location is generated. The corresponding node 208 in the data structure 206 is shown. The data structure 206 also shows which nodes in the path contain the point. The nodes that contain the point are the only ones subdivided in the generation process.

The recursive subdivision is independent of a data structure or data set, unlike some spatial indexing techniques such as R-trees. Therefore, a mobile communications device can independently generate a spatial hierarchy identifier if the mobile communications device knows a position, either its own position or a position provided to the phone, and has an algorithm for the recursive subdivision of space. The hierarchical spatial identifier can be generated simply by recursively subdividing each region that includes the position until a specified depth is reached. The calculations to perform the subdivision are well known in the art.

Due to the ability to generate spatial identifiers independently of a data set of data structure, the generation process can be performed on the mobile device with a limited amount of software and no information about the spatial database other than what spatial hierarchies are supported and the specification for generating the spatial hierarchy identifiers. A mobile device can be a cell phone, personal digital assistant, laptop, smart phone, portable media player, information appliance, personal communicator, wearable computers, or other computing devices that can be easily moved. The specification will contain information such as how to subdivide space, the geometry of the subdivisions, the maximum depth of the subdivision, and any other information required. This allows the mobile device to preprocess any query or other request, thus saving significant computing resources on the computers performing the search. For the preprocessing of a query or request into a spatial identifier to be useful, the spatial identifier generation specification must be known to the mobile device and correspond to the spatial identifier generation specifications used by any services or software that process the mobile devices requests.

Figure 6:
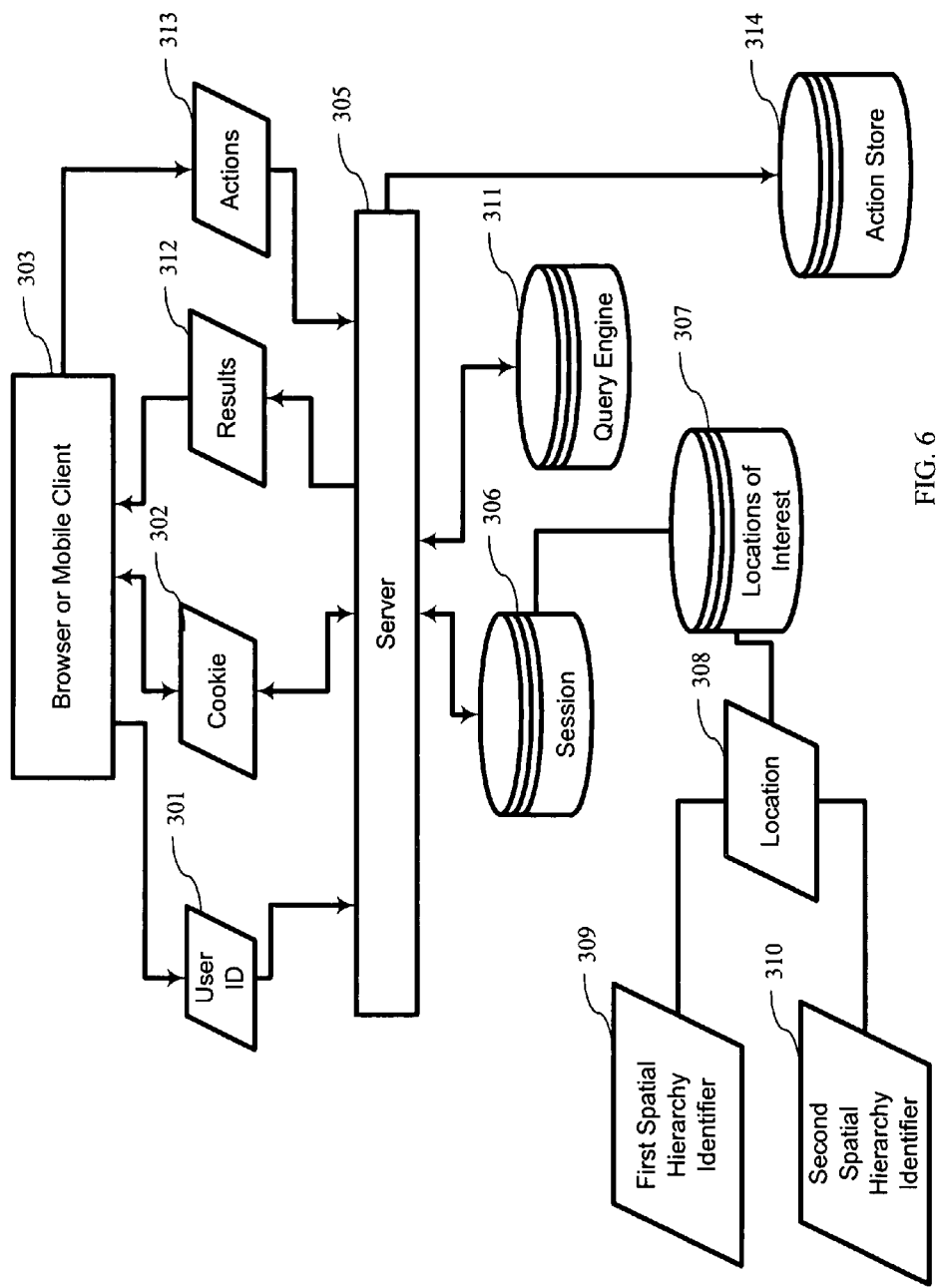
FIG. 6 shows the association of user related data with spatial hierarchy identifiers.

FIG. 6 shows the association of user related data with spatial hierarchy identifiers. A spatial hierarchy generator created a first spatial hierarchy 309 and a second spatial hierarchy identifier 310 for location 308. Location 308 is stored as a set of locations of interest 307 that are associated with a user. One method of associating a set of locations of interest 307 with a user is by storing the set of locations of interest 307 in the user's session 306. Server 305 manages the session 306. Session 306 may be referenced by the server 305 and the client 303 through the use of a cookie. Mobile clients and web clients will likely manage user credentials differently. User ID 301 is associated with a web browser, mobile device or other client device 303. User ID 301 can be anything that identifies a user such as a certificate, login name, token, assigned number, or other identifier. Client 303 can provide location information in a multiple ways. User ID 301 may enter an address or automatically determine location through a GPS or other location determining means. Client 303 can also present a map to the user so that the user may choose a location. User ID 301 may have pre-generated a list of locations of interest or an analytical process may have inferred a list of user locations of interest from user search queries or other user activities.

FIG. 6 shows the association of a first spatial hierarchy identifier 309 and a second spatial hierarchy identifier 310. First spatial hierarchy identifier 309 and second spatial hierarchy identifier 310 and location 308 can be stored in a database or other data store as user locations of interest 307. Locations of interest are any location that is of interest to a particular user. A user may designate their home as a location of interest. Alternatively, mobile clients 303 can pass locations to server 305 as part of search or other requests. Mobile clients 303 can also compute the first spatial hierarchy identifiers and the second spatial hierarchy identifiers on the mobile client 303 and pass the location and the first spatial hierarchy identifiers and the second spatial hierarchy identifiers to server 305 along with a request.

In addition to generating spatial hierarchy identifiers based on web or mobile requests, data sets can be preprocessed by generating spatial hierarchy identifiers for each data item and then storing the resulting data and spatial hierarchy identifiers. This allows the data set to be efficiently indexed in a distributed, partitioned, geospatial index and then used by a location-based operation such as a search that is initiated for a user location or locations.

User logs into the Client 303. The server 305 creates session 306 and a cookie 302 is passed back to client 303. Subsequent requests to server 305 will contain cookie 302. Application software running on server 305 will use cookie 302 to look up session 306. Locations of interest 307 stored in the session 306 can be used by location-based applications running on server 305. Alternatively, locations of interest can be directly passed through the server 305 from a client capable of determining a location and generate a first spatial hierarchy identifier and optionally a second spatial hierarchy identifier. The generation of a first spatial hierarchy identifier or a second spatial hierarchy identifier must correspond to the first spatial hierarchy or the second spatial hierarchy respectively used by location-based applications. Location-based applications that can understand first spatial hierarchy identifiers 309 and second spatial hierarchy identifiers 310 stored along with the corresponding location in 308 can use the first spatial hierarchy identifiers 309 and second spatial hierarchy identifiers 310 to efficiently perform the requested location-based operation.

FIG. 6 shows query engine 311 responding to a client 303 location-based search request. Server 305 inspects the cookie 302 provided by client 303 and finds the session 306 associated with the user ID 301. Application software running inside server 305 finds the locations of interest stored in session 306. These locations of interest 307 are sent to the query engine 311. Query engine 311 can efficiently use the first spatial hierarchy identifier 309 and second spatial hierarchy identifier 310 to perform a location-based search. In order to perform a distributed search, only the first spatial hierarchy identifier is required. The second spatial hierarchy identifier increases the performance of the search.

FIG. 6 shows the results 312 being sent to client 303. Results 312 are associated with the locations of interest 307 that were used to perform the location-based search. The fact that results 312 were returned to client 303 can be stored in a data warehouse or the action store 314 for analytical processing. Results 312 can be indexed in the warehouse based on first spatial hierarchy identifier 309 and second spatial hierarchy identifier 310. Indexing in the warehouse by first spatial hierarchy identifier 309 and second spatial hierarchy identifier 310 allows analytical software to efficiently process the gathered data. Results 312 can be pushed to the client 303 unrequested or sent in response to a request.

FIG. 6 shows that client 303 takes actions 313 upon receipt of the results 312. The captured actions 313 are passed to server 305. Application software on server 305 processes the actions 313 and stores them in action store 314. Action store 316 is indexed based on the first spatial hierarchy identifier 309 and second spatial hierarchy identifier 310. More than two spatial hierarchy identifiers can be used.

Figure 7:
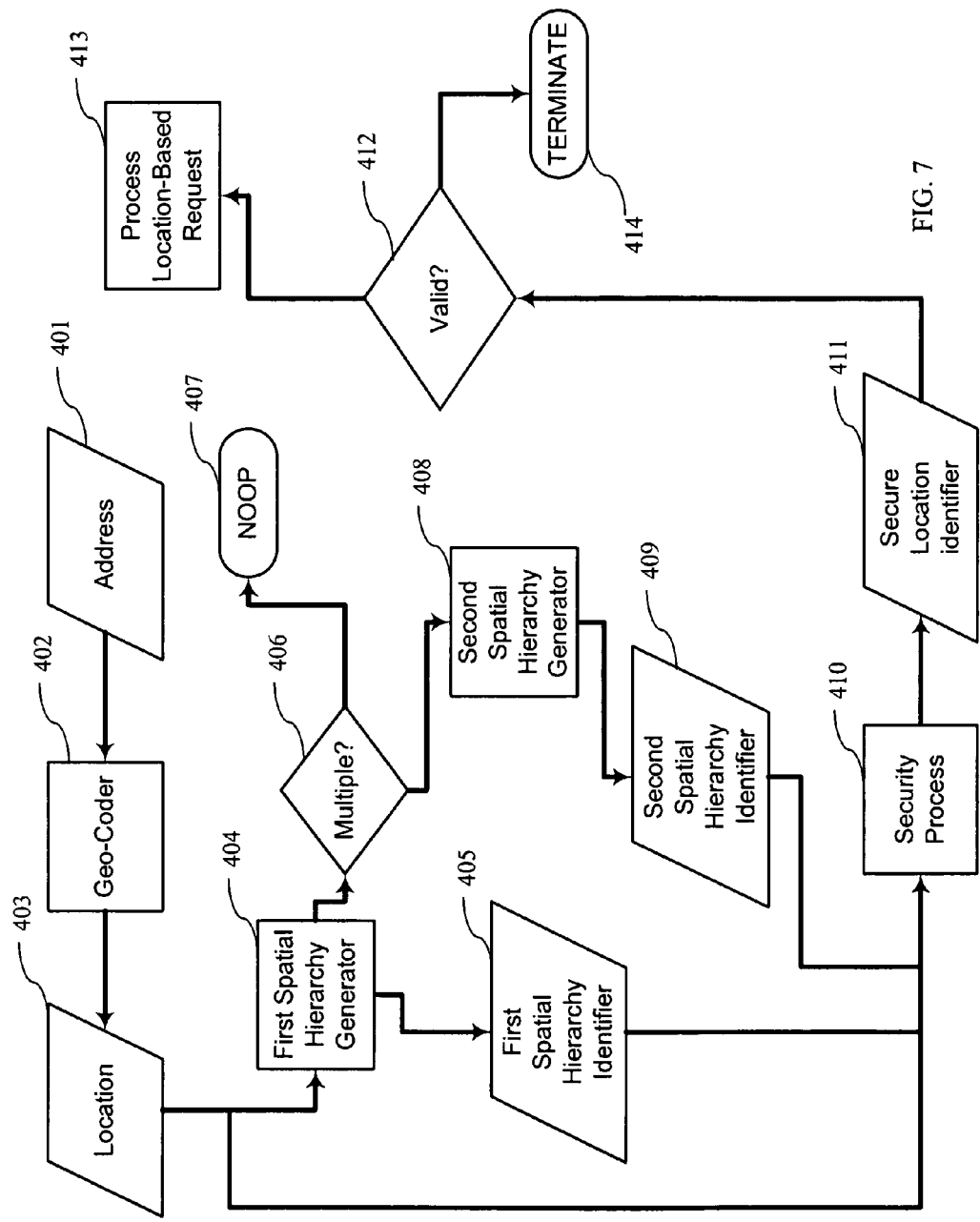
FIG. 7 shows the generation of secure spatial hierarchy identifiers.

FIG. 7 shows a process for securing location information. Address 401 is converted into a location 403 by a geo-coder 402 using the geo-coding process shown in FIG. 1. Location 403 can also be sent to the spatial hierarchy generator 404 process directly. For instance, a mobile device may send in GPS data. Locations can be represented by multi-dimensional coordinates in any chosen coordinate system. Any geodetic coordinate system can be used as well as any map projection. Spatial hierarchy generator 404 generates at a first spatial hierarchy identifier 405 and optionally can generate a second spatial hierarchy identifier 409 given the location 403. The first spatial hierarchy identifier 405 and the second spatial hierarchy identifier 409 are associated with a different spatial hierarchy. A spatial hierarchy is different than another spatial hierarchy if they decompose a given region into sub-regions differently. FIG. 2, FIG. 3, FIG. 4, and FIG. 5 show the generation of a spatial hierarchy identifier using a spatial hierarchy based on triangles.

In a computer program, the association of an object such as a user ID or other user related data such as results and actions can be associated with a spatial hierarchy identifier in any manner. For instance, an object and spatial hierarchy identifier can be associated through a lookup take. The object may contain a field that is set to an object representing a spatial hierarchy identifier. The object may contain a long integer field that is set to the 64-bit identifier specified by the spatial hierarchy identifier. The spatial hierarchy identifier may be placed in a container such as a web session already associated with a user. There are many ways to do the association and none are precluded.

FIG. 1 shows associating a location with a spatial hierarchy. In this example, an address 11 is geo-coded into a location 13 represented with multi-dimensional coordinates such as latitude and longitude. Geo-Coder 12 queries a database that contains street names, street prefixes and suffixes, states, zip codes, and optionally place names. The geo-coder 12 normalizes the address 11 submitted the by user if possible, otherwise it returns an error. The components of the normalized street address are used to query the street address database. These components can include zip code, city, state, street name, street number, or other commonly used components of an address. The geo-coding database contains street segments indexed by street name, address range, zip code, state, and optionally city or place designator. Each street segment contains a start point and an end point. Intermediate points may also be included. The query of the street address database finds the street segment that includes address 11 in the street segments address range. The geo-coder 12 interpolates the location for the submitted address 11 using a simple linear interpolation process that assumes each address in the street segment address range has the same length. Typically, the addresses are not the same length and so the linear interpolation is subject to some error. After the geo-coder 12 is complete, the location 13 can be sent to a first spatial hierarchy generator 14. The first spatial hierarchy generator creates the first spatial hierarchy identifier 15 using the spatial hierarchy that will be used for first spatial hierarchies. Decision block 16 will determine if a second spatial hierarchy should be generated. If the process is configured or directed to create a second spatial hierarchy identifier, then second spatial hierarchy generator 18 will generate a second spatial hierarchy identifier 19 using a spatial hierarchy that is different than the spatial hierarchy used by the first spatial hierarchy generator 14. If a second spatial hierarchy is not going to be generated, then the decision block terminates with a NOOP 17.

Security process 410 can encrypt an object containing one or more spatial hierarchy identifiers and optionally the location associated with the spatial hierarchy identifiers. Security process 410 can generate a digital signature for an object containing one or more spatial hierarchy identifiers and optionally the associated location. The encrypted or digitally signed object containing the spatial hierarchy identifier and optionally location is the secure location identifier 411. Any cryptographic hashing algorithm can be used or any suitable encryption algorithm. User credentials can also be optionally included in the combined object containing the spatial hierarchy identifiers and optional location.

The secure location identifier 411 can be used to represent a location securely and efficiently for use by location-based application. For example, the secure location identifier 411 can be sent with a request to a location-based search application 413. Before a request associated with a secure spatial hierarchy identifier 411 can be processed, it must be verified. Decision block 412 shows that if it is valid, the request will move on to process location-based request 413. If it is not valid, decision block 412 shows that the process terminates at terminate 414 before going to the location-based request processor. To efficiently process the operation, the spatial hierarchy identifiers would be used to efficiently identify the search index nodes containing the results. The location-based application can also use the secure location identifier to determine efficiently if the user requesting the operation has permissions to request the specified operation at the identified location.

The first spatial hierarchy generator 404 can limit the depth of the spatial hierarchy identifier in order to limit the resolution of the position that can be inferred from the spatial hierarchy identifier. For instance, the spatial hierarchy identifier can be limited to represent a region in the spatial hierarchy that is no smaller than 1 mile.

The spatial hierarchy identifier identifies a spherical triangle on the earth. The position is known to be within the triangle. The precision of that is only meaningful from a privacy standpoint if the triangle is in a small enough area. If the width of the base of the triangle is, for example, ¼ mile in a suburban residential neighborhood, the location or identity of the user can't be determined. Simply limiting the depth at which the spatial hierarchy identifier is generated makes the smallest spatial region of the spatial hierarchy large enough so the user's position can't be exactly determined and is in fact, obfuscated to some extent.

It will be apparent to those skilled in the art that various modifications and variations can be made in method of associating user related data with spatial hierarchy identifiers for efficient location-based processing of embodiments of the invention without departing from the spirit or scope of the invention. Thus, it is intended that embodiments of the invention cover the modifications and variations of this invention provided they come within the scope of the appended claims and their equivalents.

What is claimed is:

1. A program storing computer-readable instructions therein for instructing a computer to perform analytical steps for associating user related data with at least two spatial hierarchy identifiers corresponding to at least two different spatial hierarchies, the program comprising: a non-transitory, computer readable recording medium readable by the computer; and the computer instructions stored on said recording medium instructing the computer to perform the processes including:
    receiving user related data;
    determining a user that is associated with the user related data;
    determining at least one location associated with the user;
    generating at least one first spatial hierarchy identifier associated with a first spatial hierarchy;
    generating at least one second spatial hierarchy identifier associated with a second spatial hierarchy;

associating the at least one location with the at least one first spatial hierarchy identifier and the at least one second spatial hierarchy identifier; and associating the user related data with the at least one first spatial hierarchy identifier and with the at least one second spatial hierarchy identifier.

2. The program of claim 1, wherein the user related data is the result of a request associated with a user.

3. The program of claim 1, wherein the user related data is an action associated with a user.

4. The program of claim 1, wherein the user related data is sent to the user without the user making a request.

5. The program of claim 1, wherein the first spatial hierarchy identifier identifies first regions within the first spatial hierarchy associated with the at least one location and the second spatial hierarchy identifier identifies second regions within the second spatial hierarchy associated with the at least one location.

6. The program of claim 1, wherein the at least one location associated with the user is determined by using a mobile device with location-determining means.

7. The program of claim 1, wherein the at least one location associated with the user is determined by user registration of his locations of interest.

8. The program of claim 1, wherein the at least one location associated with the user is determined by the user choosing a location using an interactive map.

9. The program of claim 1, further performing the processes including: storing the user related data and the at least one spatial hierarchy identifier and the at least one second spatial hierarchy identifier in a database.

10. The program of claim 1, further performing the processes including:

storing the at least one spatial hierarchy identifier using a string representation of the spatial hierarchy identifier as an index.

11. A program storing computer-readable instructions therein for instructing a computer to perform analytical steps for preprocessing data for efficient location-based indexing, the program comprising: a non-transitory, computer readable recording medium readable by the computer; and the computer instructions stored on said recording medium instructing the computer to perform the processes including:

loading data associated with at least one location;

generating at least one first spatial hierarchy identifier, which includes a path to an identified node in a first spatial hierarchy, for identifying first regions within the first spatial hierarchy associated with the at least one location;

generating at least one second spatial hierarchy identifier for identifying second regions within a second spatial hierarchy corresponding to the at least one location, wherein the at least one first spatial hierarchy is different than the at least one second spatial hierarchy;

storing the data with the at least one first spatial hierarchy identifier; and storing the data with the at least one second spatial hierarchy identifier.

12. The program of claim 11, wherein the location is represented by at least one address, and further performing the processes including:

generating the at least one location by geo-coding the at least one address.

13. The program of claim 11, wherein the location is represented using multi-dimensional coordinates.

* * * * *